United States Patent [19]

Collier

[11] Patent Number: 4,464,851
[45] Date of Patent: Aug. 14, 1984

[54] UNDERWATER HARVESTER FOR MARINE LIFE

[75] Inventor: John A. Collier, Pendleton, S.C.

[73] Assignee: Clemson University, Clemson, S.C.

[21] Appl. No.: 389,957

[22] Filed: Jun. 18, 1982

[51] Int. Cl.³ .......................... A01K 75/00; E02F 5/00
[52] U.S. Cl. ........................................... 37/55; 37/72; 37/DIG. 8
[58] Field of Search .................... 37/55, 72, DIG. 8; 254/900

[56] References Cited

U.S. PATENT DOCUMENTS

| | | | |
|---|---|---|---|
| 1,070,271 | 8/1913 | Lybeck | 37/55 |
| 2,288,701 | 7/1942 | Heden | 37/55 |
| 2,363,251 | 11/1944 | Jurisich | 37/55 |
| 2,508,087 | 5/1950 | Bailey | 37/55 |
| 2,672,700 | 3/1954 | Hanks, Jr. | 37/55 |
| 3,184,866 | 5/1965 | McMillin | 37/55 |
| 3,238,708 | 3/1966 | Zickefoose | 37/55 X |
| 3,512,281 | 5/1970 | Hadjidakis | 37/72 X |
| 3,521,386 | 7/1970 | Francklyn | 37/55 |
| 3,734,564 | 5/1973 | McKay et al. | 254/900 X |
| 4,084,334 | 4/1978 | Wolters et al. | 37/72 X |
| 4,175,342 | 11/1979 | DeKoning et al. | 37/72 X |
| 4,280,288 | 7/1981 | Corfa et al. | 37/DIG. 8 X |

FOREIGN PATENT DOCUMENTS 2033944 5/1980 United Kingdom ........... 37/DIG. 8

OTHER PUBLICATIONS

Godwin, Walter F., "Development of a Mechanical Seed Oyster Relaying Program in North Carolina", Mar. 1981.
Jordan et al., "Development of Equipment for the Mechanical Harvest of Oysters in South Carolina: Progress Report", Presented at 1975 Annual Meeting Amer. Soc. of Ag. Engineers, pp. 1-22, Jun. 1975.

Primary Examiner—Clifford D. Crowder
Attorney, Agent, or Firm—Wellington M. Manning, Jr.; Luke J. Wilburn, Jr.

[57] ABSTRACT

A mechanical harvester for marine bivalve mollusks and the like. A harvester head is provided for movement along a bottom to be harvested, which head includes driven tined elements for dislodging mollusks from the bottom and for removing dislodged mollusks and conveying same away from the bottom. The harvester head is supported by a cable system, preferably from a marine vessel, that is adapted to impart a substantially constant lifting force on the harvester head over a predetermined range of water depth, such that a predetermined pressure only is applied by the head against the bottom during harvesting, whereby damage to the bottom that would hinder replenishment of marine life is avoided. The harvester head is also capable of pitch and roll movement to follow the contour of the bottom during harvesting.

6 Claims, 5 Drawing Figures

UNDERWATER HARVESTER FOR MARINE LIFE

BACKGROUND OF THE INVENTION

This invention relates to a harvester that is moved along the bottom of a body of water for the purpose of disloding and harvesting marine bivalve mollusks and other marine life from the bottom of the body of water, while avoiding adverse effects to the bottom such that continued replenishment of life at such locations does not become disrupted.

Historically, the collection or harvesting of marine bivalve mollusks, such as oysters, clams, and the like, has involved a hand operation in which an individual digs the bottom mud, silt or sand of the littoral zone with appropriate tongs, diggers or the like and dislodges the intertidal mollusks therefrom. Such procedure is labor intensive, tedious, costly, and subject to the personal whims of the individual harvesters.

In an attempt to improve upon the harvesting of bivalve mollusks and the like, prior attempts have been made to devise mechanical harvesters that move along the bottom of the littoral zone, normally when the tide is in and water covers the mollusk bed or colony, to dislodge the mollusks from the bottom mud, sand, bed or the like, and where appropriate, to segregate individual mollusks from cluster formations, after which the mollusks are collected and transported to an appropriate boat, barge, or other floating storage unit. Such prior attempts, while successful from the standpoint of removing the oysters, clams or the like from the beds of same, have been fraught with problems. Particularly, the prior attempts, as will be alluded to in more detail hereinafter, have been complicated and expensive devices, but most particularly in an attempt to remove the mollusk from the beds of same, the removal process has been accompanied by destruction of the strata in which the mollusks live. For example, a hydraulic clam dredge was referred to by Aristotle around 344 B.C. and his treatise, *History of Animals*, wherein he states: "In the Pyrrhaean Strait, the clam was exterminated, partly by the dredging machine used in their capture . . . ". Yet, much more recently, hydraulic clam dredges have been utilized extensively for harvesting clams, which dredges operate on the principle of mechanically slicing a horizontal layer of bottom sediment, after which the solids in the layer are dispersed and dislodged with high pressure jets of water. Clams and oysters along with rather large quantities of additional foreign matter are then elevated to the surface to be loaded onto a boat, barge, or other receptacle. Obviously, since a significant portion of the bottom sediment is removed, large power requirements are required to generate force adequate to push the dredge through the sediment, and also to lift same, while likewise the energy required for high volume, high pressure pumping of fluid for washing the clams is extremely high.

A semi-hydraulic dredge is set forth in U.S. Pat. No. 2,508,087 which dislodges oysters from an oyster bed by relatively gentle flow of water and deposits the dislodged oysters on a screen conveyor, which transports the oysters to the surface while permitting sand, gravel, silt and the like to pass through the screen and return to the water. A further mechanical harvester for intertidal cluster oysters has been developed which includes a rotating digging element which digs into the bottom, removing virtually everything therefrom. Water is then pumped against the load to remove silt, etc. and force the oysters into a chute and onto a vessel.

Still another harvester head has been developed that includes a rectangular steel box in which two steel cylinders are affixed with flexible steel tines. The cylinders, powered by a hydraulic motor, rotate in the direction of travel, raking oysters and clams from the bottom which are conveyed to the surface by an escalator device.

Most pertinent perhaps is a predecessor project to the present invention which is defined along with the aforementioned prior harvester attempts in a paper by Andrew G. Jordan et al, entitled "Development of Equipment for the Mechanical Harvest of Oysters in South Carolina: Progress Report", presented at the 1975 annual meeting of the American Society for Agricultural Engineers in Davis, Calif., June 22-25, 1975. The Jordan et al mechanical harvester includes a sled associated with a boat for movement along an oyster bed. The sled includes a harvester head employing a first, tined loop element that is rotatable in the direction of movement of the sled to dislodge oysters from an oyster bed, and a second tined loop element located behind the dislodgement element, rotatable in an opposite direction to pick up dislodged oysters and convey same to an escalator, a front end of which was associated with the sled and a rear end of which, with the boat. While the Jordan et al mechanical harvester was successful in harvesting intertidal oysters, the significant overall weight of the sled and escalator did create problems. Particularly the oyster bed supporting strata was damaged which as discussed hereinafter, is quite undesirable.

Oyster spat, sperm of the oyster, is found in the water during particular times of the year, generally May or June. The spat are mobile in the water until they succeed in finding an appropriate point for securement. Once the spat becomes affixed, it is thereafter immobile, and grows into an oyster, which likewise includes the production of the oyster shell. Attachment of the spat occurs on a firm support, such as pilings, rocks and the like, though predominantly on previously existing oyster beds where the firm support surface is a firm strata which may include dead or live oyster shells. As the oyster population increases in an oyster bed, oyster clusters are formed which, unless properly harvested, become overly dense to a point where the bottom layers of oysters in the cluster may become eventually covered with silt and die. An unharvested bed would thus continue to build until there is no available room, even at high tide, for additional spat to attach, whereupon the oyster bed will eventually die out and remain in place. Such of course reduces the productive capacity of oysters along the coast line, and creates impediments to boating, and the like. On the other hand, when an oyster bed is properly harvested, without damage to the underlying strata, new spat will attach to the remaining strata during the spawning season and the bed will continue to produce for future harvesting. While, as mentioned above, prior art harvesters were successful in harvesting the oysters, certainly more effectively than by hand, all of the known prior art harvesters generally destroyed or at least impaired the firm strata of the bed, whereby replenishment of the bed to a harvestable condition has required a number of years, if ever.

The mechanical harvester of the present invention overcomes the aforementioned problems of the prior art mechanical harvesters, in that, oysters, clams and the like may be effectively, and economically harvested without the danger of damaging the underlying firm strata. Consequently, the same oyster bed will remain productive and is again ready for harvesting, generally in two years. Additionally, and quite importantly, the mechanical harvester of the present invention is capable of effectively and economically removing oysters from one area and redepositing same at a more desirable location for proper oyster growth. For example, as has been publicized greatly in the last few years, mollusks such as clams and oysters, have often been located in polluted environs, whereby human consumption of same is precluded. By utilization of the mechanical harvester of the present invention, however, these polluted mollusks may be removed from the contaminated environs and transported to a clean, and acceptable environment. Once located in the clean environment, the mollusk will purge itself of the pollution contaminants in the matter of a few weeks, and thereafter will be available for harvesting and human consumption. This procedure thus improves the managerial possibilities for aquaculture.

Still further, commercial oystering operations are generally required by law to reseed oyster bed areas with old shells which assists in reestablishment of the harvested oyster beds. Such can be accomplished by the harvester of the present invention.

The mechanical harvester of the present invention is far more efficient than the prior mechanical harvesters, is capable of operation in varying water levels, and effectively harvests mollusks in a fashion heretofore unseen. The prior mechanical harvesters described above are deficient in teaching or suggesting the mechanical harvester according to the present invention.

SUMMARY OF THE INVENTION

It is an object of the present invention to provide an improved mechanical harvester for marine life, such as marine bivalve mollusks.

A further object of the present invention is to provide an improved mechanical harvester for the harvesting of intertidal oysters while avoiding damage to the shell matrix of the oyster bed.

Still another object of the present invention is to provide an improved mechanical harvester for marine bivalve mollusks and the like from the littoral zone of intertidal waters while applying a predetermined amount of pressure only against the strata or matrix on which the mollusks grow.

Still further another object of the present invention is to provide an improved mechanical harvester for the automated collection of intertidal oysters, which harvester has the capability of pitch and roll to follow the contour of the bottom on which the oysters grow, while applying a predetermined amount of pressure only against the bottom so as to avoid damage to same.

Generally speaking the present invention relates to a mechanical harvester for marine life comprising means moveable along a bottom to be harvested, including operative means for dislodging and removing said marine life therefrom, and adjustable control means operatively associated with said moveable means for applying a substantially constant predetermined lifting force to same during harvesting, whereby a predetermined force only will be applied by said moveable means against the bottom from which said marine life are being harvested, to avoid damage thereto.

The present invention more specifically relates to an improved mechanical harvester which includes a harvester head having a rigid framework designed to be transported along the bottom of a body of water, in contact with said bottom; dislodging means associated with said framework for engaging said bottom and marine life located thereat that is to be harvested for the purpose of separating same from said bottom and/or other adjacent marine life structures; collecting means disposed behind said dislodging means for engaging and removing said marine life from said bottom; and support means for said framework, said support means being adjustable to apply a predetermined support force for said framework over a predetermined range of depth of water to permit said framework to apply a constant predetermined force only against said bottom over the operating depth range whereby damage to the bottom is avoided.

The improved mechanical harvester according to the present invention as a complete harvesting entity includes a marine transport vessel which is preferably composed of a pair of spaced apart elongated pontoons having appropriate structure interconnecting same, while leaving a significant free space between the pontoons for location of harvesting apparatus and to permit dead shell, waste materials, silt and the like that are removed from the bottom during the harvesting operation to fall therethrough back into the water. The marine vessel is of course provided with a suitable power plant and controllably supports a harvesting head that is to be moved along the bottom such that the harvesting head can follow contour of the bottom and while exerting a substantially constant predetermined pressure only against the bottom to avoid damage thereto. The controllable support means for the harvesting head includes a super structure on the vessel to which is associated a cable arrangement. One end of the cable is secured to the harvesting head and the other end to a power take up means. Means are provided intermediate the cable length for maintaining substantially constant pressure on the cable over an operating range of from about 2 to about 10 feet water depth. Pressure of the harvesting head against the bottom may thus be maintained at a predetermined constant amount with the harvesting head being automatically raised or lowered to the proper depth.

The harvesting head is preferably a skeletal frame having skids received along the lower side of same for contact with the bottom to be harvested. A first rotary tined element is supported within the skeletal frame at a forward end of the head. The tines move in a counter-clockwise direction (direction of movement of the head) to engage mollusks on the bottom and dislodge same, either from clusters, from oyster beds, or otherwise from within the fragile strata along the bottom. A second rotary tined element is located behind the dislodging element, operating in a direction opposite the dislodging element to engage dislodged mollusks and convey same upwardly from the bottom, to a receptacle located behind the second rotary tined element. Both of the rotary tined elements are disposed at an angle such that only a forward end of same engages the bottom, with the forward end of each being suspended from the framework while the rearward end is adapted for pivotal movement about a horizontal axis. As such, as the harvester head moves along the bottom, should either of the tined elements engage an enlarged object, a front end of the element will move upwardly, pivoting about its rear horizontal axis and thus avoid damage thereto while permitting continued harvesting operation.

The receptacle or pan located behind the conveying tined element is positioned immediately adjacent an escalator conveyor which is associated with the harvester head, with an open side of the pan generally located at the conveyor and a bottom wall of the receptacle approximately the angle of incline of the conveyor. High pressure water nozzles are directed into the receptacle through which water is directed under pressure against the mollusks to remove silt and dirt therefrom and at the same time, force the mollusks onto the escalator conveyor for transport to the surface of the vessel. Mollusks are preferably deposited by the escalator conveyor onto a cross conveyor which transports same onto a storage barge or the like, which is affixed to and towed by the vessel.

More specifically as to the cable support system, as alluded to above, a first end of the cable is secured to the framework of the harvester head. The cable then extends around a guide sheath, around a second sheath secured to a piston rod that is movable along a hydraulic cylinder and an opposite end of the cable is secured to a powered winch or other appropriate take up means. Hydraulic pressure in the cylinder acts on the rod and sheath to apply a predetermined, substantially constant tension to the cable and thus a predetermined upward force to the harvester head to overcome a portion of the weight of same whereby a predetermined substantially constant pressure only is applied by the harvester head against the harvestable bottom. Utilizing such a controlled support, damage to the oyster bed or other appropriate fragile strata is avoided during harvesting. In a preferred arrangement, a plurality of switch means are operatively associated with the take up means and are located adjacent the hydraulic cylinder. Appropriate switch actuator means are also associated with the rod to actuate certain of the switch means at particular locations during rod movement, whereby cable length is automatically adjusted for water depth and head pressure against the bottom remains substantially constant irrespective of depth. For example, three limit switches may be applied, with a rear switch becoming actuated during inward movement of the rod, indicating the reduction in depth of water thus actuating the take up means to reel in cable as the harvesting head moves into the shallow area, whereby the upward force on the head may remain substantially constant. A middle limit switch is engaged when the rod is generally in a medial location to deactuate the take up means. Conversely, should a greater depth of water be encountered, the rod will move outwardly as the head moves deeper until a forward switch is engaged which energizes the take up means to feed out additional cable until the harvester head ceases its descent and the rod moves inwardly of the cylinder adequate to engage the middle switch and deactuate the take up means. In this fashion, within a predetermined operative depth range, such as from about 2 to about 10 feet, there is an automatic self-centering operation of the piston rod with respect to the hydraulic cylinder to maintain substantially constant tension on the support cable over the operable depth range.

DESCRIPTION OF THE PREFERRED EMBODIMENTS

Figure 1:
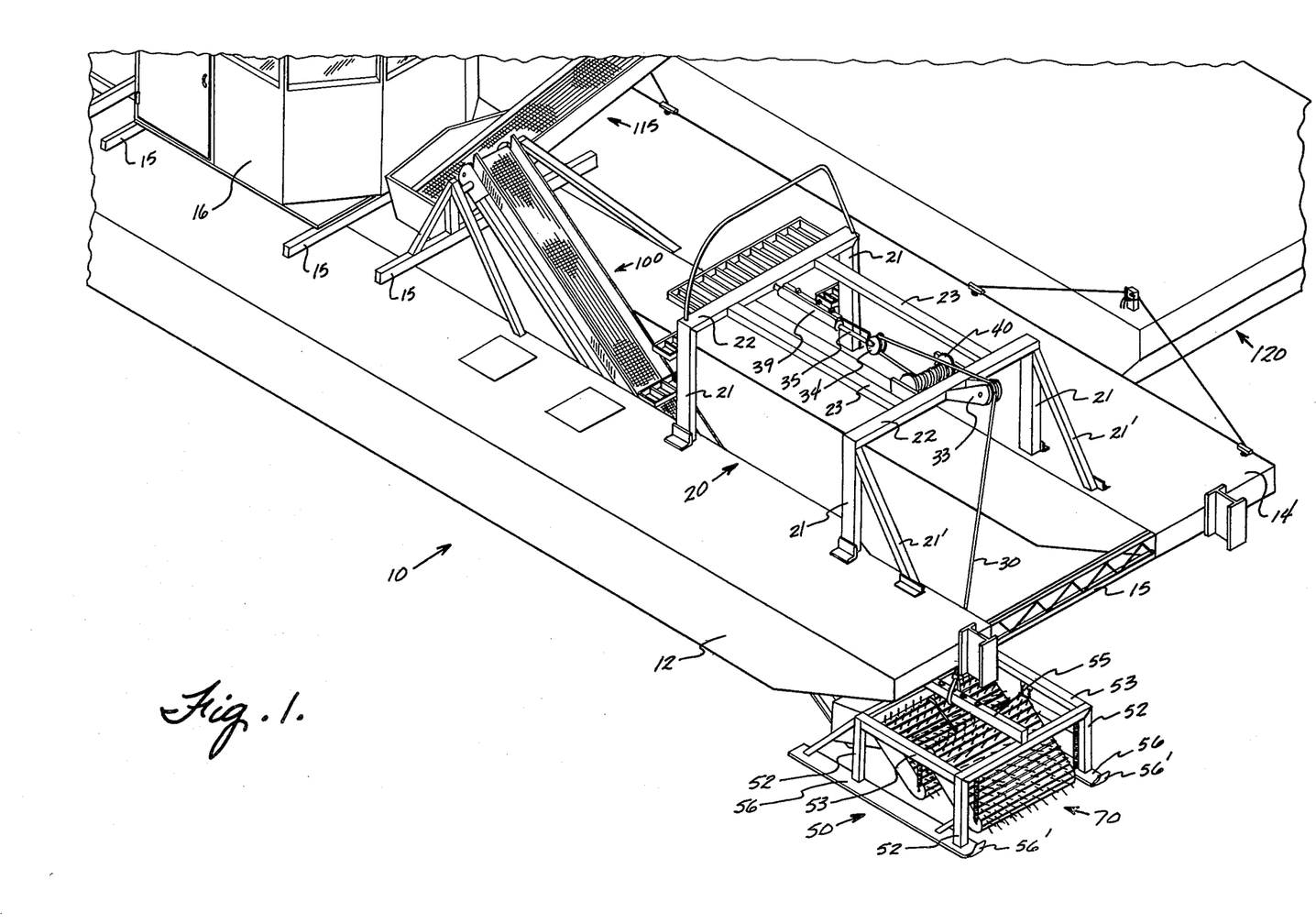
FIG. 1 is a partial isometric view of an improved mechanical harvester according to teachings of the present invention.

Referring to the Figures, preferred embodiments of the present invention will be described in detail. FIG. 1 illustrates a complete marine harvesting unit according to teachings of the present invention. Such unit includes a marine vessel generally indicated as 10 which is preferably a low draft vessel capable of operation in shallow intertidal waters, and which serves, as will be described hereinafter, as support and motive power for a harvester head generally indicated as 50 and a storage barge generally indicated as 120 while also supplying power for operation of all apparatus incident to the harvesting operations.

The preferred embodiment according to teachings of the present invention is illustrated in the Figures. Vessel 10 is made up of a pair of elongated, spaced apart pontoons 12 and 14 that are interrelated along their lengths by horizontal structural members such as members 15 and has an aft cabin 16 (partially shown) along with a suitable power train (not shown). A diesel motor (not shown) is located adjacent cabin 16 and supplies power for the hydraulic and high pressure pumping systems described hereinafter. The separated pontoon configuration for vessel 10 affords a work surface for operators that is particularly stable. At the same time the space defined between pontoons 12 and 14 receives elements of the harvester and also permits dead shell, silt and other unwanted materials to fall back into the water.

Harvester head 50 is suspended from a support structure generally indicated as 20 which spans the space between pontoons 12 and 14 at the bow of vessel 10. Support structure 20 generally includes a plurality of vertical struts 21 secured to pontoons 12 or 14. Horizontal struts 22 are secured to vertical struts 21 with further horizontal struts 23 secured between struts 22. Diagonal bracing struts 21' may be employed, if necessary. A harvester head suspension system is associated with support structure 20 in a manner described hereinafter. A cable 30 extends downwardly from a structure 20 between pontoons 12 and 14 and is secured to harvester head 50 such that head 50 will be suspended therefrom in a generally balanced state. As vessel 10 moves through the water, with harvester 50 suspended from cable 30, harvester 50 is pulled along the bottom with the operative portions of same functioning to dislodge and harvest marine life from the bottom.

Making reference now to FIGS. 1, 2 and 3, harvester head 50 will be described in detail. Harvester head 50 includes a framework that is defined by a plurality of vertical support struts 52 which are interconnected to a plurality of horizontal support struts 53 and diagonal bracing struts 54, and to which bottom skids 56 are secured having an upturned forward end 56', such that skids 56 may slide along the bottom. Cable 30 is secured to harvester 50, and more particularly, to a central horizontal support beam 55 such that head 50 will be suspended in a generally balanced condition. Cable 30 is wrapped around beam 55 and clamped at the balance point, and studs 55' located atop beam 55, both indicate the general balance point, and preclude movement of cable 30 therefrom. Located generally within the confines of the aforedescribed skeletal frame are a marine life dislodging means generally indicated as 70 and a marine life pick up and conveying means generally 80.

Dislodging means 70, in a preferred embodiment, is provided by a pair of looped chains 72 that are spaced apart, having a predetermined number of connector bars 73 secured therbetween around the loop. Each connector bar 73 has a plurality of spring steel tines 74 secured thereto. Each of the chains 72 is received about a pair of sheaves 75 and 76, which in turn are received at opposite ends of shafts 77 and 78, respectively. Shafts 77 and 78 are secured for rotation at side plates 79 which are suspended from the frame of harvester head 50 at an angle to the bottom such that tines 74 will extend below the lower side of skids 56 into the bottom strata to dislodge marine life therefrom. Dislodging means 70 thus assumes the appearance of a continuous, open belt and the overall unit is supported at its rear upper end in pivotal association about shaft 78 by a pair of support struts 57, which themselves are pivotally supported by the frame at locations 58, and at an opposite end by a pair of chains 61. A forward end of dislodging means 70 is supported by a pair of chains 59 which are secured to brackets 60 of horizontal struts 53. One of the pair of sheaves 75 or 76 will be driven to provide a rotary motion to dislodging means 70 in the direction of the arrow during which, tines 74 will dislodge marine life, preferably by a hydraulic motor secured to an end of the particular shaft for same. Particularly, in the sense of oysters, tines 74 will engage the oysters while digging slightly into the oyster bed and will separate the oysters from the bed. In like fashion, when a cluster of oysters is encountered, tines 74 will break same apart. Since the forward end of the dislodging means 70, as shown in FIG. 2, makes engagement with the bottom, should tines 74 engage a large object on the bottom, continued movement of chains 72 in conjunction with the resilient suspension chains 59 will permit the forward end of dislodging means 70 to move upwardly, pivoting around shaft 78 as mentioned hereinbefore.

Located immediately behind dislodging means 70 is the pick up and conveying means 80 which in similar fashion to dislodging means 70 is comprised of a pair of outside chains 82 received about sheaves 85 and 86 located on shafts 87 and 88 respectively. Since significantly greater weights will be encountered by conveyor means 80, an intermediate chain 82' (See FIG. 4) is provided around intermediate sheaves (not shown) such that connector bars 83 are connected between outside chains 82 and intermediate chain 82', thus reducing the length of each bar 83 by approximately one half. As may be seen in FIG. 2, connector bars 83, and thus tines 84 secured thereto, are more closely spaced than connector bars 73 and mounted dislodging tines 74. As such pick up and conveying means 80 is strengthened. A forward end of conveyor means 80 is likewise suspended by chains 63 from brackets 62 secured to horizontal member 54 while a rear end of same is pivotally secured to a horizontal element 64 about shaft 88. Conveying means 80 may thus move upwardly in the event that large objects are encountered. One of the shafts 87 or 88 is likewise power driven, preferably by a hydraulic motor (not shown), with the direction of movement being opposite the direction of movement of the dislodging means 70 as shown by the arrow. In this fashion, chains 82 moving in a clockwise direction bring tines 84 into engagement with the oysters or other marine life having been dislodged by tines 74, picking up same from the bottom, and conveying same along the length of conveyor means 80.

Figure 2:
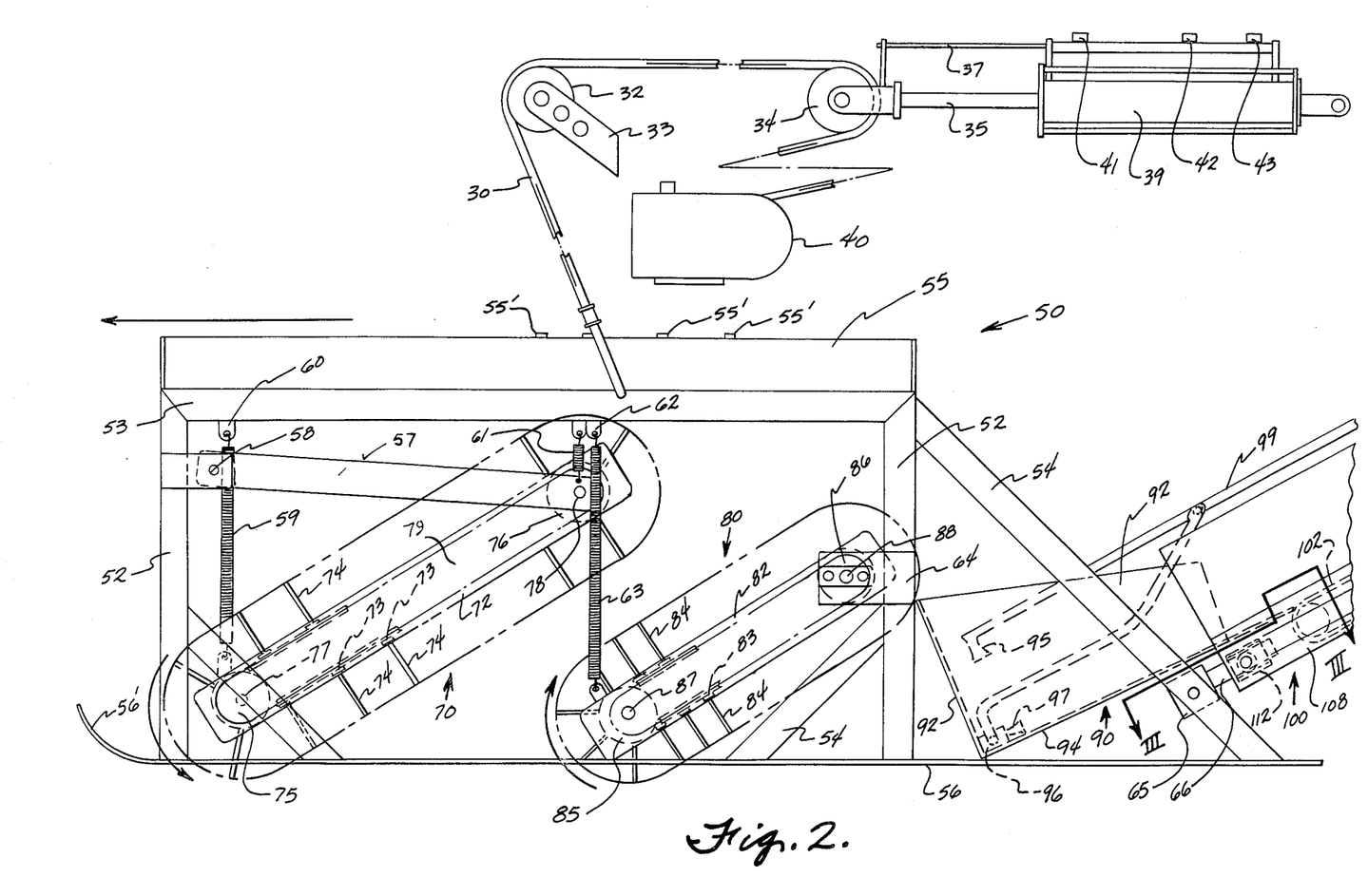
FIG. 2 is a side elevational view of a harvester head according to teachings of the present invention.
Figure 4:
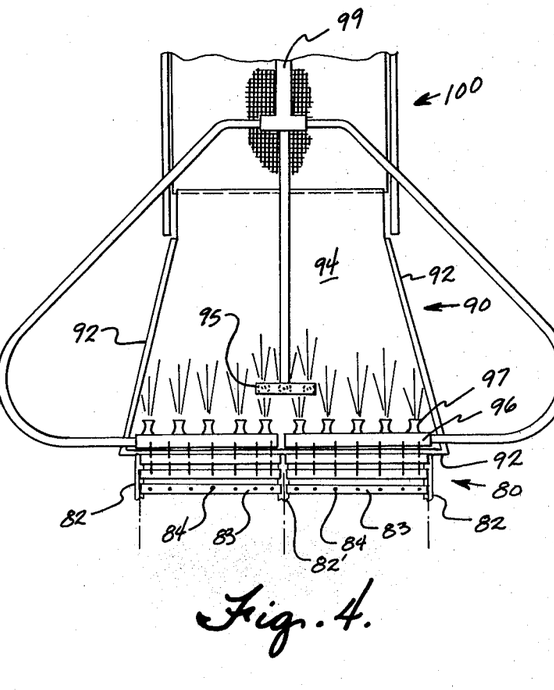
FIG. 4 is a partial plan view of the apparatus of the present invention illustrating relationship between the mollusk receptacle and the escalator conveyor.

Marine life will drop from the rear of conveying means 80 into a wash receptacle generally indicated as 90 (See FIGS. 2 and 4). Wash receptacle 90 is secured to the frame of harvester head 50 and is defined by side and back walls 92 and an angularly presented bottom wall 94 that is approximately axial to the plane of an adjacent escalator conveyor generally 100. A plurality of high pressure water nozzles 95 are directed against the lower portion of receptacle 90 being supplied water under pressure via conduit 99 from a source not shown, such that, oysters and other marine life located in receptacle 90 are washed. Likewise, a manifold 96 which receives water from conduit 99 is located within wash receptacle 90, and has a plurality of high pressure nozzles 97 directed toward escalator conveyor 100, along bottom wall 94. Water pressure for nozzles 95 and 97 thus dynamically forces the mollusks out of receptacle 90 and onto escalator conveyor 100 for transport to the top surface of the vessel 10.

Figure 3:
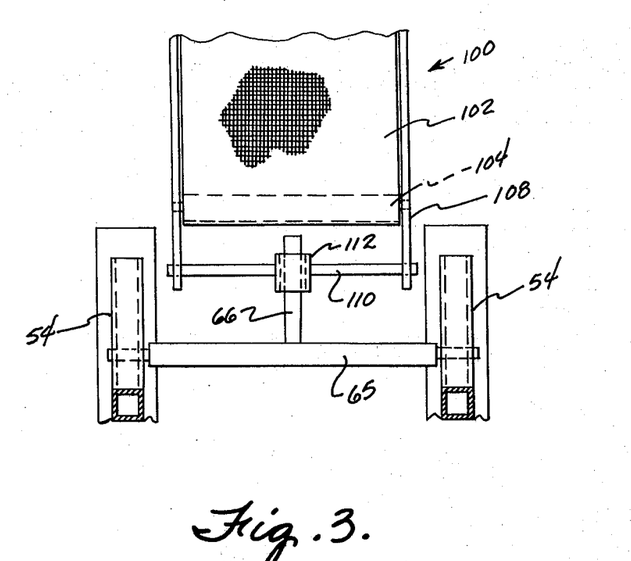
FIG. 3 is a partial cross sectional view of a portion of a harvester head according to the present invention illustrating connection to an escalator conveying means.

As can be seen in FIGS. 2 and 3, frame 50 is also associated with escalator conveyor 100 in a generally universal fashion such that head 50 can pitch or roll through an angle of approximately 20 degrees and thus follow the contour of the bottom. Particularly, a connector element 65 is secured for rotation between rear diagonal braces 54 of head 50. A cylindrical connector pin 66 is secured to element 65 intermediate the length of same. Escalator conveyor 100 includes a standard screen conveyor 102 which is received about sheaves (only one sheave 104 being shown) at opposite ends of same. Such sheaves are secured for rotation at side walls 108 and one sheave is driven, preferably by a hydraulic motor. Side walls 108 extend beyond lower sheave 104 and a connector rod 110 is rotatably received therebetween. Connector rod 110 is provided with a connector sleeve 112 intermediate its length in which connector pin from head 50 is freely received. Such a connection between head 50 and escalator conveyor 100 permits head 50 to pitch and roll as aforementioned.

An important feature of the present invention is provision of the suspension support for harvester head 50 to apply a constant upward force of a predetermined amount thereon, thus permitting only a limited predetermined force to be applied by harvester head 50 against the bottom over which it travels. As best illustrated in FIG. 2, cable 30 is properly secured about beam 55 of head 50 for a generally balanced suspension. Cable 30 extends upwardly, around a guide roll or sheath 32 that is appropriately associated with a horizontal strut 22 by a pair of plates 33. Thereafter, cable 30 passes around a further roller or guide means 34 that is secured to an outer free end of a piston rod 35. Rod 35 is movable within a hydraulic cylinder 39 and has a linkage 37 secured thereto for movement with rod 35. After guide means 34, cable 30 passes to take up means 40 which is illustrated as a motorized winch and is secured to same. Cylinder 39 has a plurality of switch means 41, 42, and 43, preferably limit switches, associated therewith. Switch 41, 42, and 43 are operatively associated with the motor for take up means 40 and are actuatable by linkage 37 during movement of rod 35.

Figure 5:
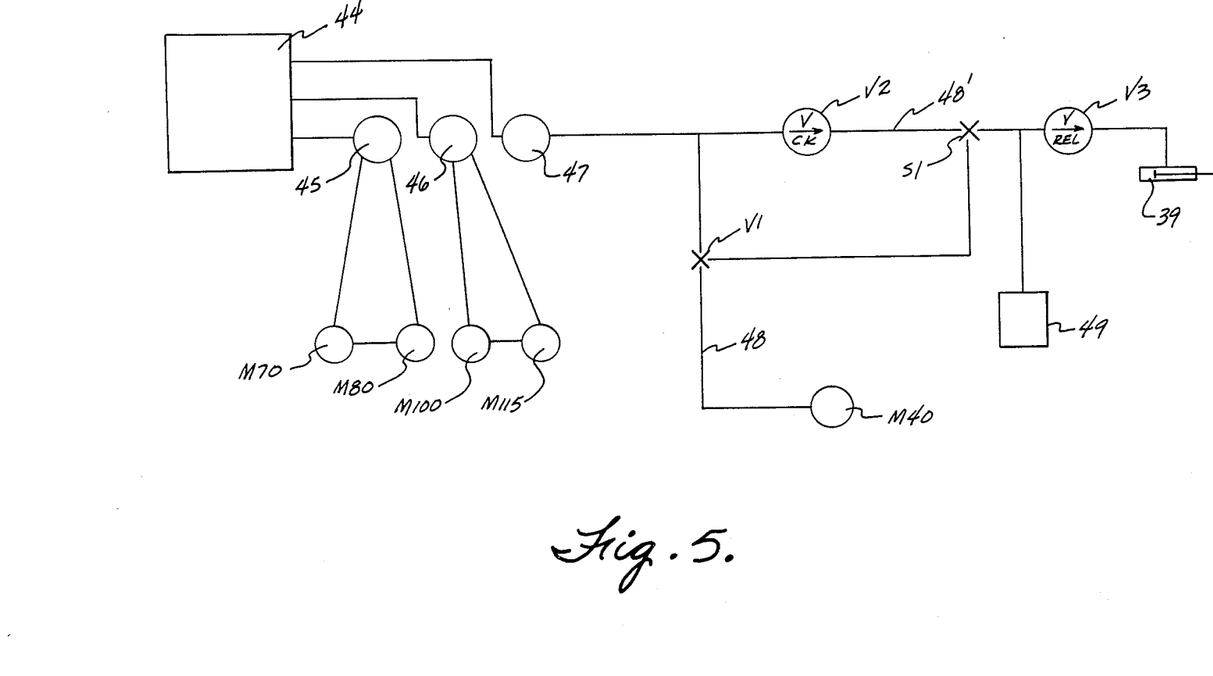
FIG. 5 is a schematic of a preferred hydraulic system for use with the harvester of the present invention.

Referring to FIG. 5, the hydraulic system utilized for operation of the present invention will be explained. A hydraulic fluid reservoir 44 is provided with three pumps 45, 46, and 47. Pump 45 operates in a closed system with hydraulic motors M70 and M80 which are operatively associated with shafts 78 and 88, respectively, for rotating dislodging means 70 and conveying means 80. Pump 46 operates in a closed system with hydraulic motors M100 and M115 which are operatively associated with and supply power to escalator conveyor 100 and cross conveyor 115 respectively.

Pump 47 is connected to cable take up motor M40, through one conduit leg 48, and to cylinder 39 and accumulator 49 through conduit leg 48'. A normally closed solenoid valve V1 diverts hydraulic fluid first via check valve V2 and pressure sensitive switch S1 to accumulator 49 where hydraulic pressure rapidly builds to around 1200 psi. Pressure switch S1 then opens solenoid valve V1 and permits hydraulic fluid to flow through conduit 48 to take up motor M40 for operation, if needed. Pressure relief valve V3 reduces pressure to about the level required for cylinder 39. Hence after hydraulic pressure is reached and maintained at accumulator 49, take up motor M40 may operate.

With the mechanical harvester of the present invention thus operational, and vessel 10 moving along the water over an oyster bed, harvester head 50 rides on skids 56 along the bottom, and applies a predetermined pressure only against the oyster bed, determined by the tension applied to cable 30. If, for example, the harvester head, due to its weight, is capable of applying 1,500 pounds of pressure against the oyster bed which could cause damage to the underlying material, by applying an upward force of 1,000 pounds on harvester head 50 via tension on cable 30, only 500 pounds of pressure is applied against the bottom. Depending upon the type of strata encountered, a different amount of force may be tolerated, the pressure of the harvester head 50 against same can be closely controlled to less than the critical amount, such that damage to the strata is avoided. Particularly, hydraulic fluid supplied to cylinder 39 via conduit 48' imparts a predetermined force against piston rod 35, which in turn applies a like force via roller means 34 to tension cable 30 proportionally. With the appropriate predetermined tension applied on cable 30, rod 35 remains in a generally central location with respect to cylinder 39 such that limit switch 42 is engaged by linkage 37 and the motor M40 remains deenergized. Should, however, the depth of water in which the harvester is operating diminish, tension on cable 30 starts to lessen and rod 35 will move inwardly of cylinder 39 to maintain the correct and substantially constant tension on cable 30. In the event that the depth has lessened adequately, rod 35 will move far enough that limit switch 43 is contacted by linkage 37 which energizes motor M40 to take up cable. As cable 30 is being reeled in, rod 35 will reverse directions, and start again to move outwardly. Once limit switch 42 is made, motor M40 is deenergized and ceases to take up of cable 30. Conversely, if the harvester unit runs into deeper water, rod 35 will extend further from cylinder 39 as head 50 descends, to maintain the substantially constant tension on cable 30, until limit switch 41 is engaged by linkage 37 which energizes motor M40 to operate winch 40 in a reverse direction, such that additional cable is played out. Harvester head 50 is thus permitted to descend through the deeper water while the substantially constant tension is maintained on cable 30 and thus on head 50. Thereafter rod 35 again moves inwardly of cylinder 39, wheel linkage 37 makes contact with limit switch 42, and winch 40 is deenergized. In the fashion just described concerning operation of the tensioning system for cable 30, there is a continuous auto-centering motion of rod 35 with respect to limit switch 42 to maintain constant tension on cable 30 along a range of from about 2 to about 10 feet water depth.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. An improved underwater harvester for harvesting marine life such as oysters and the like from the bottom of a body of water while avoiding damage to the bottom that would disrupt replenishment of marine life thereat comprising:

(a) marine transport means;

(b) harvesting means associated with said transport means for movement along said bottom and for harvesting marine life therefrom said harvesting means comprising a framework, a rotatable closed loop element angularly associated with said framework for presenting an end of same at said bottom, said closed loop element being rotatable in a counterclockwise direction and having means thereon for engaging and dislodging marine life from said bottom, a second rotatable closed loop element angularly associated with said framework rearwardly of said first closed loop element and being rotatable in a clockwise direction, said second closed loop element having means thereon for removing dislodged marine life from said bottom and conveying same rearwardly and upwardly, and means associated with said framework rearwardly of said second closed loop element to receive marine life therefrom;

(c) escalator conveyor means associated with said transport means and said harvesting means for receiving marine life from said harvesting means and conveying same upwardly to said transport means, said conveyor means being coupled to said harvesting means to permit said harvesting means to pitch and roll thereabout; and (d) control means operatively associated with said transport means and said harvesting means for applying a substantially constant controllable lifting force to said harvesting means over a predetermined depth variation, whereby a predetermined force only will be imparted by said harvesting means against said bottom to avoid damage thereto, said control means comprising reversible power take up means, a cable secured at one end to said take up means and at an opposite end to said harvesting means, a hydraulic cylinder located intermediate the length of said cable and having a piston rod moveable therewithin with means thereon associated with said cable to impart a predetermined force thereon, first, second and third switch means located along the path of movement of said piston rod, said first switch means being associated with said take up means to actuate said take up means to reel in cable, said second switch means being associated with said take up means to actuate same to play out cable and said third switch means being located between said first and second switch means and being associated with said take up means to deactuate same, said piston rod having switch actuator means associated therewith, normally residing adjacent said third switch means, whereby variation in the depth of said harvesting means will cause said piston to move in a force compensating direction and if such movement is great enough, to actuate one of said first and second switch means to adjust the length of said cable adequate to permit said piston and said switch actuator means to contact said third switch means to deactuate said take up means and to reinstitute said predetermined force on said cable.

2. A harvester as defined in claim 1 wherein said framework comprises a skeletal frame having flattened, elongated skids along the lower side of same.

3. A harvester as defined in claim 1 wherein said disloding means and said conveying means are both disposed at an angle with respect to said bottom such that a forward end only of each makes contact with said bottom, and wherein both said means are suspended from said framwork at said forward ends of same by a flexible element such that said forward ends may move upwardly and over large objects encountered on said bottom.

4. The marine life harvester as defined in claim 1 wherein said closed loop elements comprise spaced apart chains having support bars secured therebetween, said means thereon are tines being secured to said support bars.

5. The marine life harvester as defined in claim 1 comprising further
 (e) cross conveyor means received on said transport means adjacent an end of said escalator conveyor means to receive marine life from said escalator conveyor means, and
 (f) independent marine life storage means associated with said cross conveyor means to receive marine life therefrom.

6. The marine life harvester as defined in claim 1 wherein said coupling comprises a horizontal element received along a rear end of said frame, said shaft having a cylindrical element received about a medial portion of same and extending outwardly therefrom, and a horizontal shaft received for rotation adjacent an end of said escalator conveyor, said shaft having a generally tubular element at a medial portion of same for freely receiving said cylindrical element.

* * * * *